United States Patent [19]

Jördens et al.

[11] Patent Number: 5,263,778
[45] Date of Patent: Nov. 23, 1993

[54] ELASTIC SLIDING BEARING

[75] Inventors: Ernst-Günter Jördens; Helmut Kammel, both of Damme, Fed. Rep. of Germany

[73] Assignee: Lemförder Metalwaren AG, Lemforde, Fed. Rep. of Germany

[21] Appl. No.: 777,753

[22] Filed: Oct. 10, 1991

[30] Foreign Application Priority Data

Nov. 13, 1990 [DE] Fed. Rep. of Germany ....... 4036051

[51] Int. Cl.⁵ .............................................. F16C 17/10
[52] U.S. Cl. ................................... 384/140; 384/275; 384/280; 384/295; 384/296; 384/293
[58] Field of Search ............... 384/140, 275, 296, 299, 384/300, 297, 293, 280, 295

[56] References Cited

U.S. PATENT DOCUMENTS

| | | | |
|---|---|---|---|
| 3,545,831 | 12/1970 | Köpke et al. | 384/293 |
| 4,123,122 | 10/1978 | Gabrielson et al. | 384/300 |
| 4,717,268 | 1/1988 | Orkin | 384/280 |
| 4,878,767 | 11/1989 | Halder | 384/275 |

Primary Examiner—Lenard A. Footland
Attorney, Agent, or Firm—McGlew & Tuttle

[57] ABSTRACT

The elastic sliding bearing for chassis parts in motor vehicles has a rigid inner bushing, an outer bushing, and an elastomeric body surrounding them. The inner bushing and the outer bushing are provided at both ends with axial bearing surfaces on radially extending flange projections (8, 9), and a seal surrounding the flange projections (8) on the outer bushing (2) is provided. The seal acts against the axially outer flange surface of the outer bushing (2) with at least one sealing lip. A plastic layer (5) possessing good sliding properties, whose outer contact surface with the outer bushing has lubricant pockets (6) for receiving a grease filling, is provided on the outer jacket of the inner bushing (1). The radially extending flange projections (9) at the axial ends of the inner bushing consist of an annular disk (10) each made from plastic, which is placed axially non-displaceably on the plastic layer (5) extending continuously to the axial end of the inner bushing (1) by means of a snap-in connection, while undergoing elastic expansion.

3 Claims, 1 Drawing Sheet

ELASTIC SLIDING BEARING

FIELD OF THE INVENTION

The present invention pertains to an elastic sliding bearing for chassis parts in motor vehicles including a rigid inner bushing, an outer bushing and an elastomeric body surrounding the inner bushing. The inner bushing and the outer bushing have axial bearing surfaces on radially extending flange projections and a sealing element surrounds the axial bearing surface and acts against the axially outer flange surface with at least one sealing lip.

BACKGROUND OF THE INVENTION

Such a bearing has been known from German publication DE 38,04,886-C2. Such a bearing serves mainly for mounting the guard rails and has an outer bushing made from steel-rubber material, whose internal metal sleeve is in direct contact with the sliding surface of the inner bushing, and whose external rubber body (elastomer) can be inserted into a bearing eye of a vehicle part. The flange projection extending on one side at the axial end of the inner bushing is made in one piece with the inner bushing. The radial flange projection at the axial end of the outer bushing is formed by a ring rigidly connected to the outer bushing. To reduce the inherently high wear of such sliding bearings, the sealing lip made in one piece with the rubber body in the prior-art design surrounds the profile of the two flange projections of the inner bushing and the outer bushing, which are in contact with each other, on the outside, and touches, on the axially outer side, the flange projection at the inner bushing in a prestressed state. In addition, a coating made from a plastic with good sliding properties is provided between the radially expanding flange projections on the inner bushing and the outer bushing.

German publication DE 36,13,123C2 discloses a sliding bearing, in which a plastic layer (PTFE layer), which possesses good sliding properties and has, on the contact surface with the outer bushing, lubricant pockets filled with grease for permanent lubrication, is permanently arranged between an inner bushing and an outer bushing, in which the outer bushing is surrounded by an elastomeric body (rubber body) that is connected to it, and the elastomeric body is surrounded by a rigid receiving bushing. Such sliding bearings are sensitive to mechanical effects on the plastic layer, and are unsuitable for absorbing axial loads in the prior-art design.

SUMMARY AND OBJECTS OF THE INVENTION

It is an object of the present invention to combine an axially load-bearing sliding bearing according to DE 38,04,886-C2 with the antifriction properties of a sliding bearing according to DE 36,13,123C2 in an inexpensive design, while preserving the advantages of both designs, and with improved mode of operation.

According to the invention, an elastic sliding bearing for chassis parts in motor vehicles is provided including a rigid inner bushing, an outer bushing and an elastomeric body surrounding the outer bushing. The outer bushing is provided with axial bearing surfaces on radially extending projections. A sealing elements is provided surrounding the axial bearing surface and surrounding the axially outer flange surface with at least one sealing lip. A plastic layer element, possessing good sliding properties, is positioned on an outer surface jacket of the inner bushing. Lubricant pockets are provided on a contact surface of the inner bushing with the outer bushing. A radially extending flange projection is provided at both ends of the inner bushing. The radially extending flange projection includes an annular disk made of plastic which is positioned axially non-displaceably on the plastic layer extending continuously to an axial end of the inner bushing. The radially extending flange projection is connected to the plastic layer of the inner bushing by means of a snap on connection, while under going elastic expansion.

The annular disk is provided with a collar edge which is directed toward the center of the bearing and which extends over the flange projection on the outer bushing on the outside. The plastic layer in preferably provided with an outer edge bead and the annular disk is provided with an inner bead with a diameter smaller than that of the edge bead of the plastic layer.

In this design, axial forces that may occur are transmitted by a plastic disk from the inner bushing to the outer bushing or vice versa. This plastic disk also advantageously consists of PTFE (polytetrafluoroethylene), is arranged on both sides, and is mounted rigidly on the axial ends of the coating provided on the inner bushing by means of a snap-in connection. This permits simple manufacture of the plastic layer, which has essentially the shape of a cylindrical tubular body, on the inner bushing, and of the plastic disks which can be placed on the ends of this plastic layer and which form the radially extending flange projection at both ends of the inner bushing. The radially extending flange projections on the outer bushing are advantageously formed, on both sides, by collar edges, which can be provided at the ends of a tubular outer bushing by non-machining forming. It is particularly advantageous that at its axial ends, the elastomeric body may have recesses, as a result of which greater axial elasticity of the bearing is achieved.

To achieve better sealing between the radial flange projections of the inner bushing and the outer bushing, the plastic disk extends over the radial flange projection on the outer bushing with a collar edge on the outside at the axial ends in a particular embodiment of the present invention. The contact surface of the plastic disk with the flange projection on the outer bushing may also be provided with lubricant pockets for receiving a grease filling for permanent lubrication.

To connect the plastic disk to the axial end of the plastic layer on the inner bushing, the plastic layer has an edge bead at the axial end, and the plastic disk has an inner bead with a diameter smaller than that of the edge bead, so that the inner bead can be placed over the outer edge bead at the end of the plastic layer on the inner bushing, while the inner bead expands elastically in the radial direction, so that it is firmly held.

One embodiment of the present invention is shown in the drawing.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
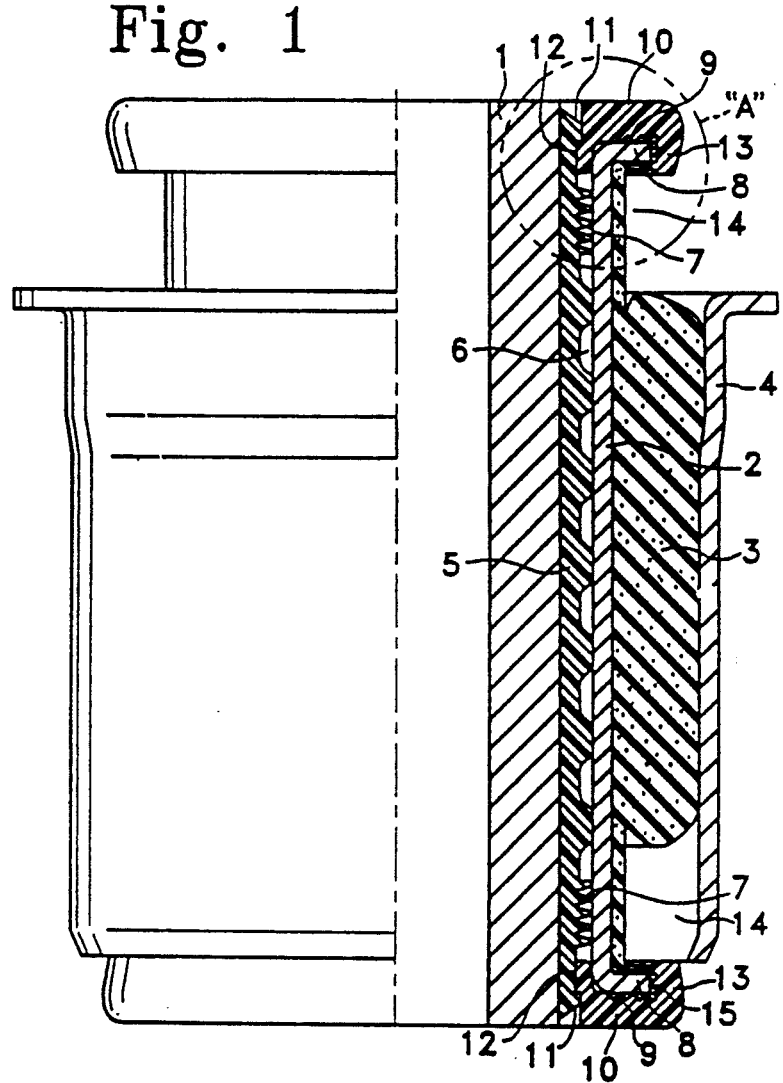
FIG. 1 is a sectional view and a view of a bearing of the new design.
Figure 2:
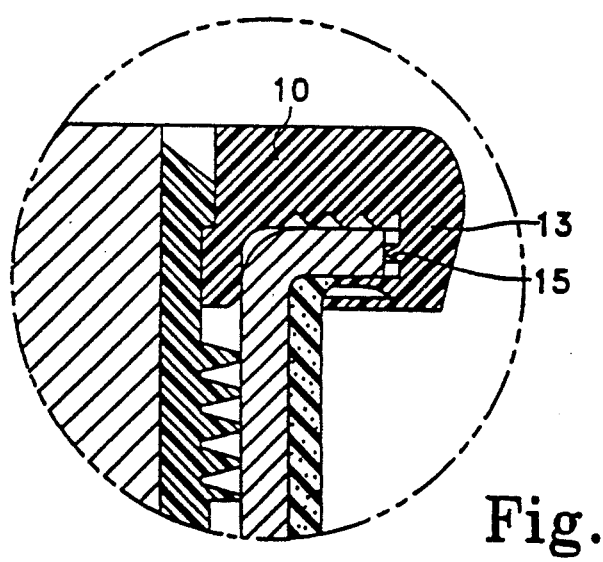
FIG. 2 is a detail "A" from FIG. 1 on a larger scale.

The elastic sliding bearing consists of a rigid inner bushing 1, an essentially likewise rigid outer bushing 2, an elastomeric body 3 surrounding this, and an outer receiving bushing 4, with which the bearing can be inserted, i.e., into a bearing eye of a guard rail (not shown in the drawing) in order to fasten the guard rail on the longitudinal beams of a motor vehicle, which is not shown either, by means of a bolt passing through said inner bushing 1.

A firmly adhering plastic layer 5, the outer contact surface of which has lubricant pockets 6 for receiving grease or the like for permanent lubrication, is located on said inner bushing 1 between said inner bushing 1 and said outer bushing 2. Sealing lips 7 are provided in the vicinity of the axial ends of said plastic layer 5 in order to prevent dirt from penetrating between the inner surfaces of said outer bushing 2 and the outer surface of said plastic layer 5, which slide on each other. Radially extending flange projections 8, which cooperate with likewise radially extending flange projections 9 at the end of said inner bushing 1, are provided at the axial ends of said outer bushing 2 by deforming the material of said outer bushing 2. The latter radial flange projections 9 are formed by a plastic disk 10, which is placed axially non-displaceably on the axially outer ends of said plastic layer 5. This is achieved with an edge bead 11 at the axial ends of said plastic layer 5 and an inner bead 12 of the annular disk 10, whose diameter is smaller than that of said edge bead 11, so that said disk 10 can be pushed over said edge bead 11 while undergoing elastic expansion in the radial direction, and will then extend behind the edge bead 11 in an elastically prestressed state. Such a design of said edge bead 11 and said inner bead 12 may also be repeated, if desired, several times one after the other in the axial direction in order to reliably prevent dirt from penetrating. Appropriate dimensioning ensures that the surface of said disk 10, which surface forms said radial flange projection 9 on said inner bushing and faces said radial flange projection 8 on said outer bushing 2, will be pressed against said flange projection 8 with a weak axial tension. To seal off the gap located between the two, a collar edge 13, which extends in the inward direction toward the center of the bearing and covers said radial flange projection 8 on said outer bushing 2, is provided on said disk 10.

As is clearly apparent from the drawing, said outer receiving bushing 4 has been selected to be shorter than the axial length of said inner bushing 1. As a result, a free space is formed between said outer receiving bushing 4 and the radial flange provided at the axial ends of said outer bushing 2 and said inner bushing 1. In the area of this free space, said elastomeric body 3 may be cut away as a whole or only in limited areas 14, in order to achieve greater axial elasticity of the bearing.

Sealing lips or other sealing means 15 of a comparable type within said collar edge 13 prevent dirt from penetrating into the bearing, if desired, in conjunction with or instead of a lip sealing, which is arranged at said collar edge 13 or prepared at this, surrounds said flange projection 8 of said outer bushing, and is in contact with the inner flank of said outer bushing.

While a specific embodiment of the invention has been shown and described in detail to illustrate the application of the principles of the invention, it will be understood that the invention may be embodied otherwise without departing from such principles.

What is claimed is:

1. An elastic sliding bearing for chassis parts in motor vehicles, comprising: a rigid inner bushing; an outer bushing, said outer bushing having an axial bearing surface formed on radially extending flange projections; an elastomeric body surrounding said outer bushing; a sealing element surrounding the axial bearing surfaces, said sealing element acting against the axial bearing surfaces of the extending flange projections with at least one sealing lip; a plastic layer, possessing good sliding properties, positioned on an outer jacket surface of said inner bushing, said plastic layer forming a contact surface of the inner bushing including lubricant pockets provided on said contact surface, facing said outer bushing; a radially extending flange projection provided at each end of said inner bushing, said flange projection including an annular disk formed of plastic, said annular disk being positioned axially non-displaceably on said plastic layer extending continuously to an axial end of said inner bushing, said annular disk being connected to said plastic layer by snap on means for connection of said disk to said layer, while undergoing elastic expansion.

2. A sliding bearing according to claim 1, wherein said annular disk includes a collar edge, said collar edge being directed toward a center of said inner bearing and extending over said flange projection of said outer bushing, on an outside of said flange projection.

3. A sliding bearing according to claim 1, wherein said plastic layer includes an outer edge bead and said annular disk includes an inner bead with a diameter smaller than that of said outer edge bead.

* * * * *